March 1, 1955  E. L. GINZTON ET AL  2,703,365
WAVEMETER FOR MICROWAVE ENERGY
Original Filed Jan. 29, 1943
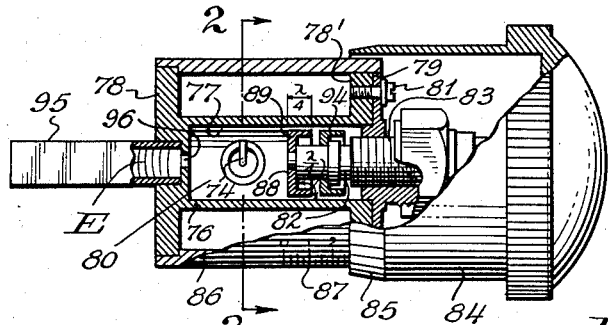
Fig. 1.
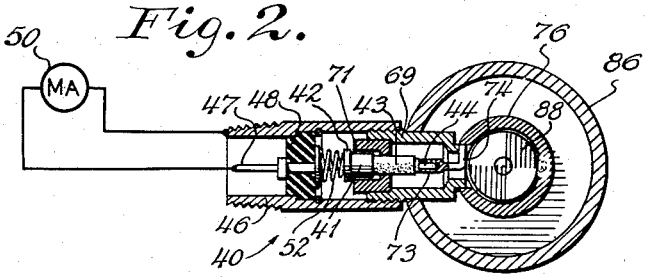
Fig. 2.
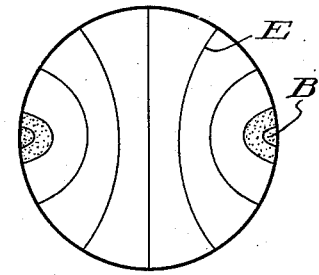
Fig. 3.
Fig. 4.
Fig. 5.
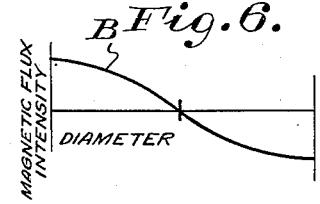
Fig. 6.
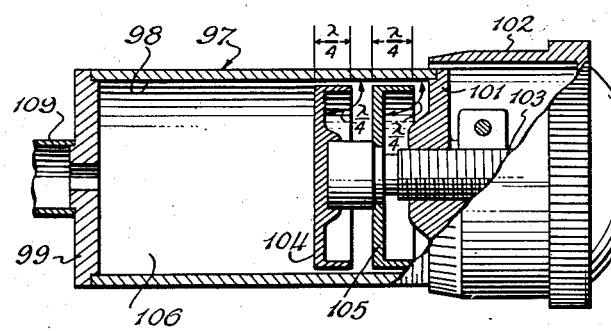
Fig. 7.
INVENTORS
E. L. GINZTON
F. L. SALISBURY
BY
Thomas M. Ferrill Jr.
ATTORNEY United States Patent Office 2,703,365
Patented Mar. 1, 1955

2,703,365

WAVEMETER FOR MICROWAVE ENERGY

Edward L. Ginzton, Menlo Park, and Frederick L. Salisbury, Redwood City, Calif., assignors to The Sperry Corporation, a corporation of Delaware Original application January 29, 1943, Serial No. 474,016. Divided and this application June 30, 1949, Serial No. 102,276

10 Claims. (Cl. 250—39)

This invention relates to wavemeters for precise determination of the wavelength and frequency of microwave energy.

This application is a division of our application Serial No. 474,016, filed January 29, 1943, issued as Patent No. 2,503,256.

An object of the present invention is to provide wavemeters of minimum energy loss and of extremely high Q, to permit very critical determination of wavelength or frequency.

It is a further object to provide extremely accurate wavemeter arrangements of very high stability, such that a calibration of the instruments, once made, remains accurate indefinitely and is not disturbed by wear of contacting surfaces.

The present invention comprehends the provision of a precision resonant cavity structure of low loss and of apparatus cooperating therewith for indication of the response to microwave energy supplied thereto through a connecting wave guide, the resonant cavity structure being variable through precision calibrated adjusting means to permit it to be adjusted for maximum indicated response and to provide a reading indicative of the wavelength or frequency of the energy.

The hollow cavity structure has a cylindrical interior bounded by electrically conductive surfaces, and one of the end boundary surfaces is movable toward the opposite end boundary surface for varying the enclosed volume of the wavemeter cavity, and accordingly varying its natural period or resonance frequency. This movable end surface element is provided with multiple quarter-wavelength transmission line sections of alternately low and high characteristic impedances, arranged to provide an effective peripheral connection between the movable boundary and the adjacent walls of the chamber without requirement of an actual direct connection such as a friction joint.

The above objects and general description of the invention will be illustrated and further objects will be made apparent in the ensuing detailed description of the invention, given in connection with the accompanying drawings, wherein:

Figs. 1 and 2 are longitudinal and cross sectional views of one wavemeter embodiment of the present invention;

Figs. 3, 4, 5 and 6 are mode charts illustrating suitable electric and magentic field distributions for the wavemeter illustrated in Figs. 1 and 2; and Fig. 7 illustrates a larger-cavity wavemeter embodiment of this invention.

Referring now to Figs. 1 and 2, a hollow spool-like body member 76 having a cylindrical bore 77 and end flanges 78 and 78' is provided with an energy input passage or aperture 96 at its left end. A plate 79 is secured as by screws 81 to the body member 76, and is provided with a central boss threaded both internally and externally. A spindle 82 is formed with a section 83 threaded to mate with the internal thread of the boss in plate 79. A micrometer-type sleeve 84 is fixed to the outer end of the threaded section 83 of spindle 82, and is provided with an engraved scale 85 of angularly spaced engine divisions at its left-hand end.

A micrometer-type barrel 86 having a divided linear scale 87 for cooperation with scale 85 is rigidly fixed to body member 76. The pitch of the divisions of scale 87 corresponds to the thread pitch of threaded section 83, so that the circular edge of sleeve 84 travels an axial distance of one division of scale 87 per revolution. Thus, the divisions of the circular scale 85 correspond to precise subdivisions readable along with the divisions of scale 87, in the manner well known in the micrometer caliper art.

A conductive end disc surface 88, effectively comprising one end wall of the resonant chamber 80 bounded by bore 77 and the integral left-hand end wall of spool 76, is mounted on the inner end of spindle 82. A thin rightwardly extending cylindrical sleeve 89 is provided on the periphery of disc 88. This sleeve 89 may be formed integrally with end disc 88. The spacing between the cylindrical sleeve 89 and the spindle 82 is much greater than the spacing between sleeve 89 and the bore 77, and cylindrical sleeve 89 is substantially one quarter-wavelength long for a frequency in the band over which the wavemeter resonates, so that a first quarter-wavelength coaxial transmission line section of low characteristic impedance is formed between cylindrical sleeve 89 and bore 77 and a second quarter-wavelength coaxial transmission line section of appreciably higher characteristic impedance is formed between cylindrical sleeve 89 and spindle 82.

A further unit including a disc-like portion extending radially outward from spindle 82 toward bore 77 and a further thin quarter-wavelength cylindrical sleeve 94 rightwardly extending therefrom is provided on spindle 82 between unit 88, 89 and the threaded portion 83. The second sleeve 94 cooperates with bore 77 as a low characteristic impedance quarter-wavelength coaxial transmission line section, and with spindle 82 as a higher characteristic impedance quarter-wavelength coaxial transmission line section. An extremely low impedance is presented between the periphery of end wall 88 and the bore 77, fully as effective as a direct connection therebetween but free from the troubles which can be introduced by reliance upon frictional contact arrangements. This extremely low impedance results from the cooperation of the four quarter-wavelength transmission line sections, as will now be described.

The quarter-wavelength section 94, 82, being short-circuited at its left end, presents a very high impedance at its right end. This impedance, with the contact between threaded section 83 and plate 79 appearing as negligible series impedance relative thereto, is transformed by the outer quarter-wavelength transmission line section 94, 77 to an extremely low impedance at its left-hand end. The next quarter-wavelength transmission line section 89, 82, being short-circuited at its left-hand end, presents very high impedance at its right-hand end, and this very high impedance and the low impedance at the left hand end of section 94, 77, acting in series, are transformed to extremely low impedance at the radial gap at the periphery of disc end wall 88. Throughout a reasonable tuning range of the wavemeter, this gap impedance is so low as not only to guard against microwave energy leakage through the space to the right of wall 88 but also to insure freedom from appreciable reaction of the wave trap system upon the Q and tuning of the resonator.

Microwave energy is led into the high Q chamber within bore 77 through wave guide 95, illustrated as a rectangular wave guide of the fundamental energy transmission mode with its transverse electric lines oriented vertically as seen in Fig. 1. This provides transverse electric mode excitation of the cavity resonator, with the transverse electric lines extending between the lower surface region and the upper surface region of bore 77 (Figs. 1 and 2) as indicated by the "E" lines in Fig. 3, and with magnetic flux in horizontal loops (with reference to the orientation of Figs. 1 and 2) as indicated by the closed line loops in Fig. 5 and by the distribution of the dots in Fig. 3.

The maximum electric field intensity is in the middle region of the interior of bore 77, as viewed in Fig. 2, with lesser intensity in the left and right side regions, the electric intensity distribution being as shown in Fig. 4. The magnetic field intensity is maximum along the side regionsc of the bore 77 as viewed in Fig 2, as illustrated by the distribution of dots in Fig. 3 and by the magnetic flux lines in Fig. 5, and as indicated by the graph in Fig. 6.

A continuous indication of the responsiveness of the cavity resonator may readily be provided by a crystal detector and milliameter, as indicated in Figs. 1 and 2. The crystal detector is a standard miniature unit with a ceramic tubular body section 43 containing the sensitive element, and with a major end ferrule 41 flanged as at 42 and a minor end ferrule including a pin 44. This crystal detector is inserted within a cartridge unit 40 comprising two principal metal tubular parts 46 and 69 in threaded engagement, the latter having affixed thereto a metal bushing 71 which supports and aligns the ceramic body section 43 of the crystal unit. The upper part of the bushing 71 is counterbored to provide a slight clearance for flanged ferrule 41, 42, and to form therewith an air-dielectric capacitor of the closely-spaced coaxial cylindrical surfaces.

A coupling loop 74 of stiff wire is attached to the end of part 69 of the cartridge, and is provided with a cup-like contactor 73 for receiving pin 44. A solid dielectric body 48 is fitted within the metal shell part 46 of the cartridge, and is provided with a fixed coaxial insert pin 47. A coaxial connector is thus formed at the ends of parts 46 and 47, for connection of a suitable cable leading to the milliameter schematically indicated at 50 in Fig. 2. A spring 52 is attached to the opposite end of pin 47, and is arranged to act against the major ferrule 41, 42 of the crystal unit to hold it firmly seated in the cartridge and to provide electric connection between ferrule 41, 42 and pin 47.

As shown in Figs. 1 and 2, the end of the cartridge part 69 provided with the coupling loop 74 communicates with the bore 77, to the extent that magnetic coupling is provided between loop 74 and the magnetic flux in the resonator.

The apparatus as illustrated in Figs. 1 and 2 is placed in operation by connecting a microwave energy source to the wave guide 95. Sleeve 84 is then slowly revolved, and the piston end surface 88 is thereby moved gradually along the axis of bore 77 to provide very gradual change of the length of the chamber 80 until chamber 80 is of such size as to afford resonance at the frequency of the energy supplied through wave guide 95 and aperture 96. The condition of resonance is indicated by maximum deflection of the pointer of meter 50 from its zero-current position. The readings of scales 85 and 87 are readily associated with resonance at known frequencies produced by a frequency standard system, and a calibration chart or graph is made up for ready reference in use of the wavemeter in the field or laboratory, for ascertaining the frequency (and wavelength) of microwave energy, or for enabling oscillators to be set to generate energy of a predetermined wavelength.

The wavemeter illustrated in Fig. 7 is very similar to that of Figs. 1 and 2, but is of larger dimensions and greater measurement range. Body 97, which serves both as the cylindrical wall of the resonator and as the stationary micrometer barrel, has a cylindrical bore 98 closed at opposite ends by walls 99 and 101. Rotatable sleeve 102 is secured to the outer end of a spindle 103 threadedly inserted in a central boss of wall 101.

Cylindrical-shell hollow pistons 104 and 105 are provided on the left-hand end of the spindle, with quarter-wavelength transmission line dimensions included therein, these units being arranged to act in the same manner as the corresponding parts of the wavemeter shown in Fig. 1.

Chamber 106 formed in the wavemeter of Fig. 7 is much larger than chamber 80 of Fig. 1, and is employed for determination of wavelengths over a somewhat larger frequency range. The wavemeter of Fig. 7 is provided with an output detector and meter arrangement (not shown) similar to that of Fig. 1. The wave guide 109 is connected to end wall 99 of the wavemeter and a centrally located aperture is provided in the end wall for admission of energy from the wave guide 109 into the chamber 106.

The operation of the wavemeter of Fig. 7 is substantially identical to that of the wavemeter of Figs. 1 and 2.

In the wavemeters above described, a hollow piston system is provided within one end of a cylindrical cavity system, and arranged with such radial and cylindrical conductive surfaces as to prevent energy leakage beyond the piston surface transversely bounding the cylindrical cavity, and providing extremely high Q in the resonator. A coaxial output detection system is provided for indicating the variation of the intensity level within the resonator, and a precision micrometer drive system is provided for rotatably controlling the longitudinal movement of the hollow piston, and permitting the obtaining of a high precision reading of the extension of the piston within the resonator bore.

As many changes could be made in the above construction and many apparently widely different embodiments of this invention could be made without departing from the scope thereof, it is intended that all matter contained in the above description and shown in the accompanying drawing shall be interpreted as illustrative and not in a limiting sense.

What is claimed is:

1. A microwave wavemeter for a wave guide transmission system including a cavity resonator comprising two cylindrical hollow conductive elements each closed at one end and disposed in adjustable telescopic relation to provide a closed cavity of adjustable length, the cylindrical portion of the inner one of the elements being substantially a quarter wavelength long at a frequency within the operating frequency band of the wavemeter, means for introducing microwave energy from said wave guide into said cavity, means for adjusting said telescopic relation of said elements to establish standing microwaves in said resonator in response to said microwave energy, means including a concentric line loosely coupled to said cavity to induce in said line signal currents in response to said standing waves, a detector connected in said line to rectify said signal currents to provide signal demodulation currents, and indicator means coupled to said line and responsive to said demodulation currents for indicating resonance of said cavity resonator to said microwave energy.

2. A microwave wavemeter for a wave guide transmission system including a cavity resonator comprising two complementarily threaded elements, each element having a hollow cylindrical portion, the respective portions being disposed in adjustable telescopic relation to provide a closed cavity of adjustable length, the cylindrical portion of the inner one of the elements being substantially a quarter wavelength long at a frequency within the operating frequency band of the wavemeter, means for introducing microwave energy into said resonator, means for adjusting said telescopic relation of said elements to establish standing microwaves in said cavity in response to said microwave energy, means including a concentric line loosely coupled to said cavity to induce in said line signal currents in response to said standing waves, a detector connected in said line to rectify said signal currents to provide signal demodulation currents, and indicator means coupled to said line and responsive to said demodulation currents for indicating resonance of said cavity resonator to said microwave energy.

3. Wavemeter apparatus comprising a first member having a cylindrical hollow space therein, a piston member cooperating with said first member to form a resonant chamber in said hollow space, calibrated screw positioning means for varying the displacement of said piston member in said cylindrical hollow space and for indicating the displacement of the piston, said piston member having an end surface forming a boundary of said resonant chamber but free from contact at its edge with the cylindrical interior surface of said first member, said piston member and said first member being in contact in a region remote from said edge, and said piston member and said first member including a series of at least two tandem quarter-wavelength transmission line sections interposed between said piston member edge and said contact region, loose coupling means for introducing ultra high frequency energy into said resonator, and means for indicating the intensity of ultra high frequency energy in said resonator.

4. Wavemeter apparatus as defined in claim 3 wherein said piston member end surface is substantially planar and perpendicular to the axis of the cylindrical interior surface of said first member.

5. Wavemeter apparatus as defined in claim 3, wherein said piston member is rigidly connected to said calibrated screw positioning means and is rotated therewith as the displacement of said piston member is varied by adjustment of said screw positioning means.

6. Wavemeter apparatus as defined in claim 3, wherein said series of tandem quarter-wavelength transmission line sections comprises four quarter-wavelength coaxial transmission line sections, alternate ones of said transmission line sections including the line section extending from said piston member edge having an appreciably lower ratio between the diameters of their inner and outer conductors than the ratio between the diameters of the inner and outer conductors of the other two of said transmission line sections.

7. An ultra high frequency wavemeter for precise determination of frequency of energy within a band of frequencies, comprising a hollow conductive body defining a chamber, a conductive plunger rotatable and axially movable within said chamber, screw-threaded calibrated means including one screw element rigidly fixed to said plunger for rotating said plunger and varying the axial position thereof within said chamber, said body having a conductive cylindrical interior wall surface and said plunger having a conductive cylindrical exterior wall surface coaxially adjacent to and of slightly lesser diameter than said cylindrical interior wall surface and forming therewith a close-spaced high-capacitance coaxial transmission line section, said conductive cylindrical wall surface of the plunger being substantially one-fourth wavelength long at a frequency in said band and said interior cylindrical wall surface of the chamber being appreciably longer and said conductive cylindrical wall surfaces being subjected to relative movement angularly and longitudinally as said plunger is moved in said chamber, means providing relatively high impedance between said conductive cylindrical wall surfaces at one end of said one-fourth wavelength surface for providing extremely low impedance between said conductive cylindrical wall surfaces at the opposite end of said one-fourth wavelength surface, said plunger and said body together comprising a high-Q resonator of resonant frequency determined by the position of said plunger, the extremely low impedance provided between said conductive cylindrical wall surfaces being included in the effective boundary of said resonator, all walls of said chamber being highly conductive and said resonator being free from any substantial energy dissipating matter and accordingly being critically responsive to frequency of energy therein, and means for loosely coupling into said resonator ultra high frequency energy for frequency determination.

8. An ultra high frequency wavemeter for precise determination of frequency of energy within a band of frequencies, comprising a hollow conductive body defining a chamber, a conductive plunger rotatable and axially movable within said chamber, screw-threaded calibrated means including one screw element rigidly fixed to said plunger for rotating said plunger and varying the axial position thereof within said chamber, said body having a conductive cylindrical interior wall surface and said plunger having a conductive cylindrical wall surface coaxially adjacent to and of slightly lesser diameter than said cylindrical interior wall surface and forming therewith a close-spaced high-capacitance transmission line section, said conductive cylindrical wall surface of the plunger being substantially one-fourth wavelength long at a frequency in said band and the interior cylindrical wall surface of the chamber being appreciably longer and said conductive cylindrical wall surfaces being subjected to relative movement angularly and longitudinally as said plunger is moved in said chamber, means providing relatively high impedance between said conductive cylindrical wall surfaces at one end of said one-fourth wavelength surface for providing extremely low impedance between said conductive cylindrical wall surfaces at the opposite end of said one-fourth wavelength surface, said plunger and said body together comprising a high-Q cylindrical cavity resonator of resonant frequency determined by the position of said plunger, the extremely low impedance provided between said conductive cylindrical wall surfaces being included in the effective boundary of said resonator, all walls of said chamber being highly conductive and said resonator being free from any substantial energy dissipating matter and accordingly being critically responsive to frequency of energy therein, means for loosely coupling said resonator to a microwave energy system for determination of frequency of energy therein, and means for loosely coupling a detector to said resonator for indicating the variation of intensity of energy therein as said plunger is adjusted.

9. An ultra high frequency wavemeter as defined in claim 8, wherein said means providing relaitvely high impedance between said conductive cylindrical wall surfaces at one end of said one-fourth wavelength surface comprises a one-fourth wavelength transmission line section coupled thereto at one end and effectively short-circuited at its opposite end.

10. A tunable resonator comprising a first hollow conductive cylindrical member closed at both ends by conductive end walls, a rod member extending through one of said end walls of said member, means for adjustably positioning one end of the rod member within said first member, a second hollow conductive cylindrical member telescopically positioned within the first member, the second member having a conductive end wall secured to the inner end of said rod member, the rod member passing axially through the cylindrical portion of the second member, whereby two concentric sections of transmission lines are formed by the inner surface of the first hollow member and the outer surface of the second hollow member, and by the inner surface of the second hollow member and the outer surface of the rod member, means for coupling microwave energy into and out of the cavity region within the first hollow member between the end wall of said second hollow member and the end wall of said first hollow member opposite said one end wall through which the rod member extends, the cylindrical portion of the second hollow member being substantially a quarter wavelength long within the resonant frequency band of the tunable resonator.

References Cited in the file of this patent

UNITED STATES PATENTS

| | | |
|---|---|---|
| 2,106,713 | Bowen | Feb. 1, 1938 |
| 2,106,771 | Southworth | Feb. 1, 1938 |
| 2,245,138 | Zotta | June 10, 1941 |
| 2,423,506 | Landon | July 8, 1947 |
| 2,439,388 | Hansen | Apr. 13, 1948 |
| 2,444,041 | Harrison | June 29, 1948 |
| 2,503,256 | Ginzton et al. | Apr. 11, 1950 |